United States Patent
Nozawa

(10) Patent No.: US 7,474,841 B2
(45) Date of Patent: Jan. 6, 2009

(54) IMAGE PROCESSING APPARATUS AND ITS CONTROL METHOD, AND COMPUTER PROGRAM AND COMPUTER-READABLE STORAGE MEDIUM

(75) Inventor: Shingo Nozawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 800 days.

(21) Appl. No.: 10/971,005

(22) Filed: Oct. 25, 2004

(65) Prior Publication Data

US 2005/0157798 A1 Jul. 21, 2005

(30) Foreign Application Priority Data

Nov. 21, 2003 (JP) ............... 2003-392076

(51) Int. Cl.
- H04N 7/01 (2006.01)
- H04N 11/20 (2006.01)
- H04N 3/36 (2006.01)
- H04N 5/253 (2006.01)
- H04N 9/11 (2006.01)
- H04N 9/47 (2006.01)

(52) U.S. Cl. .................. 386/131; 348/97; 348/441; 348/459

(58) Field of Classification Search .......... 386/1, 386/46, 95, 125, 126; 348/97, 441, 459
See application file for complete search history.

(56) References Cited

U.S. PATENT DOCUMENTS

| | | | |
|---|---|---|---|
| 4,982,280 A * | 1/1991 | Lyon et al. | 348/448 |
| 5,313,281 A * | 5/1994 | Richards | 348/443 |
| 5,337,154 A * | 8/1994 | Dorricott et al. | 348/448 |
| 5,671,320 A * | 9/1997 | Cookson et al. | 386/97 |
| 5,691,771 A * | 11/1997 | Oishi et al. | 348/97 |
| 5,703,654 A * | 12/1997 | Iizuka | 348/446 |
| 5,771,357 A * | 6/1998 | Kato et al. | 709/247 |
| 5,821,991 A * | 10/1998 | Kwok | 348/96 |
| 5,953,456 A | 9/1999 | Ikeda et al. | 382/232 |

(Continued)

FOREIGN PATENT DOCUMENTS

JP 2000-041244 2/2000

Primary Examiner—Thai Tran
Assistant Examiner—Gelek Topgyal
(74) Attorney, Agent, or Firm—Fitzpatrick, Cella, Harper & Scinto

(57) ABSTRACT

An image processing apparatus enables smooth joint recording between 2 video coded streams without re-encoding by generating and inserting a dummy stream to maintain periodicity of phase information therebetween. A 2-3 pulldown unit 110 converts moving image data having a frame rate of 24 frames per 1 second, by periodically generating 2-field picture data and 3-field picture data from respective frames, to data having 60 fields per 1 second. An MPEG unit 111 compression-encodes the converted data. At this time, phase information of fields included in the respective pictures are added. A stream information detection unit 105 detects the phase information of a field included in a head picture. On the other hand, a join position information detection unit 107 detects the phase information of a field included in a rear end of a compressed coded stream already recorded on a recording medium 104. A connection stream generation unit 106 generates a connection stream to maintain phase conformity upon connection of the two streams based on the phase information. Then the streams are recorded, in a status where the connection stream is inserted therebetween, on the recording medium.

10 Claims, 9 Drawing Sheets

U.S. PATENT DOCUMENTS

| | | | |
|---|---|---|---|
| 5,963,678 A | 10/1999 | Nozawa | 382/299 |
| 5,982,444 A * | 11/1999 | Kato et al. | 348/446 |
| 6,360,018 B1 | 3/2002 | Nozawa | 382/248 |
| 6,441,813 B1 * | 8/2002 | Ishibashi | 345/213 |
| 6,549,668 B1 * | 4/2003 | Pezzoni et al. | 382/236 |
| 6,559,890 B1 * | 5/2003 | Holland et al. | 348/441 |
| 6,587,505 B1 | 7/2003 | Nozawa et al. | 375/240 |
| 6,614,441 B1 * | 9/2003 | Jiang et al. | 345/539 |
| 6,674,480 B2 * | 1/2004 | Nakazawa | 348/459 |
| 6,707,984 B2 * | 3/2004 | Lin et al. | 386/68 |
| 6,871,003 B1 * | 3/2005 | Phillips et al. | 386/55 |
| 6,934,335 B2 * | 8/2005 | Liu et al. | 375/240.16 |
| 6,937,773 B1 * | 8/2005 | Nozawa et al. | 382/243 |
| 7,236,207 B2 * | 6/2007 | Chen et al. | 348/459 |
| 2004/0042550 A1 | 3/2004 | Nozawa | 375/240.12 |
| 2004/0109678 A1 | 6/2004 | Nozawa | 386/111 |

* cited by examiner

IMAGE PROCESSING APPARATUS AND ITS CONTROL METHOD, AND COMPUTER PROGRAM AND COMPUTER-READABLE STORAGE MEDIUM

FIELD OF THE INVENTION

The present invention relates to a technique for compression-encoding moving image and processing compression-coded moving image stream data.

BACKGROUND OF THE INVENTION

In recent years, by virtue of development of digital signal processing technology, it is possible to perform high-efficiency coding on high-volume digital information such as moving image, still image or audio information, recording of the data onto a small magnetic medium or small optical medium, and transmission of the data via communication medium. Image sensing devices or the like to easily obtain a high quality video image and immediately output the image to information medium by utilizing the above technology have been developed.

Especially, the MPEG coding technique is used in recent moving image coding. Since a code rate can be greatly reduced by using intra-frame coding for coding utilizing intra-frame correlation and inter-frame coding for coding utilizing correlation between preceding and subsequent frames, the method is widely used in video reproduction apparatuses as represented by a DVD and image sensing apparatuses as represented by a video camera.

In Japanese and U.S. television standards, the frame rate is about 30 frames per 1 second. However, the frame rate of film material video images used as movies is generally about 24 frames per 1 second. Accordingly, as shown in a reference document "ARIB STD-B20", a video image, with a frame rate of about 24 frames per 1 second, is 2-3 pulled down to a frame rate of about 30 frames per 1 second. Then, the compatibility between film material video image and television video image is improved and MPEG coding is performed by a technique disclosed in Japanese Patent Application Laid-Open No. 2000-41244.

FIG. 6 is a block diagram showing an apparatus as a combination of the above conventional art to perform 2-3 pulldown and MPEG coding on a film material video image. In FIG. 6, reference numeral 801 denotes a video signal input terminal; 802, a coding unit; 803, a recording unit; and 804, a recording medium. The coding unit 802 has a 2-3 pulldown unit 810 and an MPEG unit 811.

A video signal having a frame rate of about 24 frames per 1 second, inputted from the video signal input terminal 801, is supplied to the coding unit 802. In the coding unit 802, the video signal is rate-converted by the 2-3 pulldown unit 810 to a rate of about 30 frames per 1 second (60 fields). The conversion is so-called 2-3 pulldown widely used in conversion from film materials for movies to television video images.

FIG. 7 is an explanatory view of the processing by the 2-3 pulldown unit 810. Numerals 901 to 910 denote a field stream of video image having a frame rate of about 24 frames per 1 second. Numerals 911 to 922 denote a field stream, converted from the field stream 901 to 910, having a frame rate of about 30 frames per 1 second. In the processing, the input video image is converted by 2 fields, to output video image having alternately repeated 2 fields and 3 fields. In the figure, the fields 901 and 902 are converted to the fields 911 and 912, then the fields 903 and 904 are converted to the fields 913, 914 and 915. In this repetition of processing, output 5 fields are generated by input 4 fields, thus conversion from 24 frames per second to 30 frames per second is realized. At this time, the first and third fields upon conversion from 2 to 3 fields are the same data. For example, the fields 913 and 915 are based on the field 903. Similarly, the fields 918 and 920 are the same data.

The rate-converted video signal is supplied from the 2-3 pulldown unit 810 to the MPEG unit 811. As recommended in the ISO/IEC 13818-2, the MPEG unit 811 compresses the video signal and generates a stream by a high-efficiency coding processing, and supplies the stream to the recording unit 803. The recording unit 803 records the generated stream on the recording medium 804.

As shown in FIG. 7, the MPEG unit 811 performs compressing based on parameters supplied from the outside. To remove redundancy of the 2-3 pulldown video image, parameters "top_field_first" and "repeat_first_field" are used. If the parameter "repeat_first_field" is "0", it indicates a 2-field structure, while if the parameter "repeat_first_field" is "1", it indicates a 3-field structure. As described above, since the first and third fields are the same, image data is not generated regarding the third field. On the other hand, the parameter "top_field_first" indicates whether the top or bottom field is the first field. If the parameter "top_field_first" is "0", it indicates that the bottom field is the first field, while if the parameter "top_field_first" is "1", it indicates that the top field is the first field.

FIG. 7 shows the relation between the field stream generated by the above-described pulldown processing and the parameters "top_field_first" and "repeat_first_field". As it is understood from the figure, there are 4 combinations of these binary parameters and they are periodically repeated.

At normal recording times, coding is performed while the parameters are changed not so as to break the periodical repetition.

Next, a case where a new stream is connected to a stream already stored in the storage medium (data after the 2-3 pulldown and coding) and is recorded will be studied.

In this case, as the parameters of the already recorded stream and those of the newly connected stream are determined, a phase mismatch occurs in the parameters in a junction position. For example, in FIG. 7, the 2-3 pulldown stream has a 2-field end structure (end fields 921 and 922), and the 2 bit parameters "top_field_first" and "repeat_first_field" are (1,0). It is desirable that the parameters of the head picture of the new stream to be connected are (1,1), however, the values may not be "1" and "1", rather, a phase mismatch occurs with ¾ probability.

To solve the above problem, the already-recorded stream or the new stream is re-encoded and the parameters are re-set so as to have a continuous phase. However, re-encoding takes processing time, and further, the image quality is seriously degraded by the re-encoding.

SUMMARY OF THE INVENTION

The present invention has been made in consideration of the above problems, and provides a technique for smooth joint recording with suppressed discontinuity between pictures upon connection of two streams without re-encoding of 2-3 pulldown video image.

For this purpose, the present invention provides an image processing apparatus for processing video coded stream data, compression-encoded by converting moving image data having a predetermined frames per 1 second by periodically generating 2-field picture data and 3-field picture data from respective frames of the moving image data and adding phase information of fields in respective pictures of the converted moving image data, comprising first detection means for detecting the phase information of picture data at a rear end of an already-recorded first video coded stream, second detection means for detecting the phase information of picture data at a head of a second video coded stream to be recorded following the first video coded stream, generation means for generating a dummy stream to maintain periodicity of the phase information between the first and second video coded streams detected by the first and second detection means, and recording means for recording the dummy stream generated by the generation means to a storage medium, so as to insert the dummy stream between the rear end of the first video coded stream and the head of the second video coded stream.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
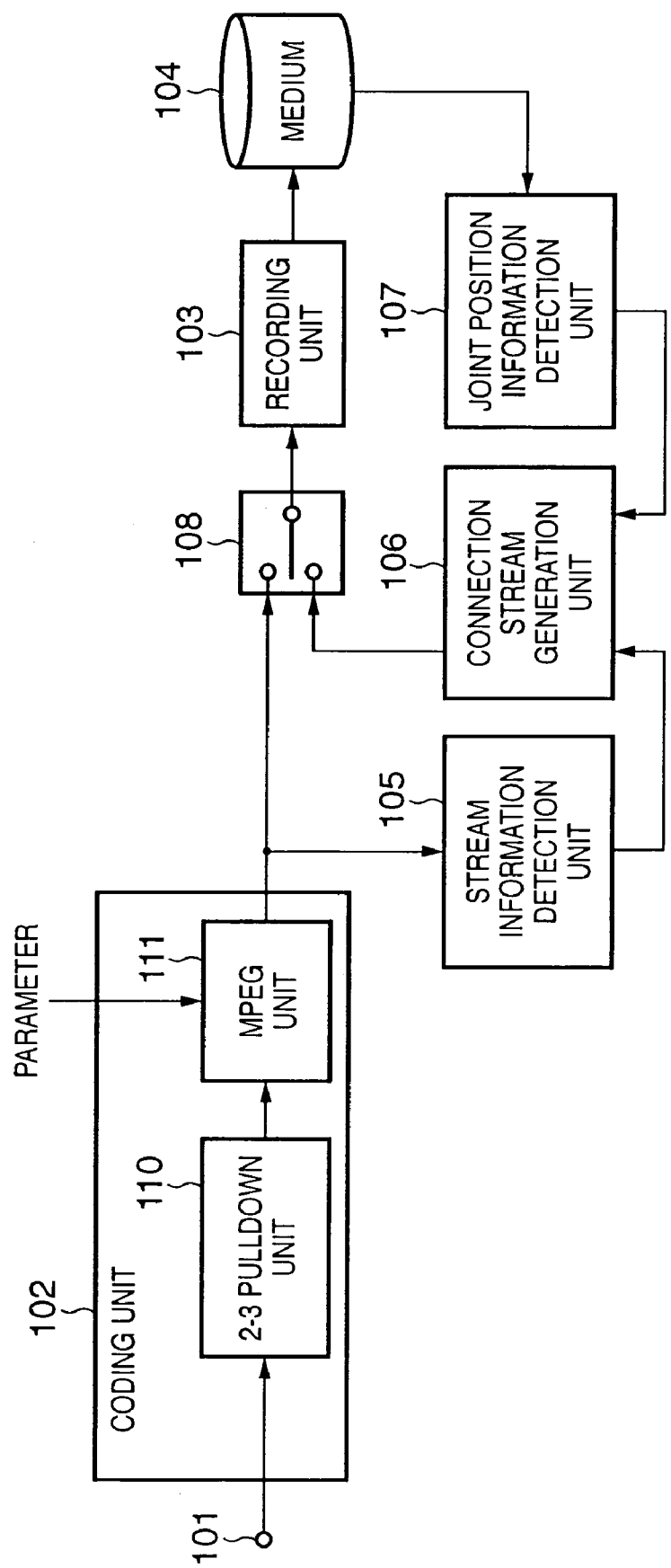
FIG. 1 is a block diagram showing an image processing apparatus according to a first embodiment of the present invention.

FIG. 1 is a block diagram showing an image processing apparatus according to a first embodiment of the present invention. In FIG. 1, numeral 101 denotes a video signal input terminal; 102, a coding unit; 103, a recording unit to access a recording medium 104 for reading/writing; 104, a recording medium such as a writable disk or magnetic tape 105, a stream information detection unit; 106, a connection stream generation unit; 107, a joint position information detection unit to access the recording medium 104 to read information on a recorded stream; and 108, a selection unit. The coding unit 102 has a 2-3 pulldown unit 110 and an MPEG unit 111.

A video signal having a frame rate of about 24 frames per 1 second, inputted from the video signal input terminal 101, is supplied to the coding unit 102. In the coding unit 102, the video signal is rate-converted by the 2-3 pulldown unit 110 to a rate of about 30 frames per 1 second (60 fields). As described above, the conversion is well-known 2-3 pulldown method.

Note that as the video input terminal 101, any unit may be employed as long as it inputs a 24 frames/sec. video image. For example, an image sensing apparatus (or image sensing means) to obtain a 24 frames (48 fields)/sec. video image or a film scanner to sequentially read a 24 frames/sec. film material video image (each frame is read as 2-field video image data, otherwise, read data may be converted to 2 field data thereafter on the apparatus side). Further, a network interface may be employed if material data exists on a network.

The rate-converted video signal is supplied from the 2-3 pulldown unit 110 to the MPEG unit 111. The MPEG unit 111 compresses the video signal and generates a stream by a high-efficiency coding processing as recommended in the ISO/IEC 13818-2, and supplies the stream to the selection unit 108 and the stream information detection unit 105.

As shown in the figure, the MPEG unit 111 performs compressing based on parameters supplied from the outside. As in the above-described prior art, to remove redundancy of the 2-3 pulldown video image, parameters "top_field_first" and "repeat_first_field" are used.

If the parameter "repeat_first_field" is "0", it indicates a 2-field structure, while if the parameter "repeat_first_field" is "1", it indicates a 3-field structure. As described above, since the first and third fields are the same, image data is omitted regarding the third field. On the other hand, the parameter "top_field_first" indicates whether the top or bottom field is the first field. If the parameter "top_field_first" is "0", it indicates that the bottom field is the first field, while if the parameter "top_field_first" is "1", it indicates that the top field is the first field. There are 4 combinations of these binary parameters and they are periodically repeated.

That is, assuming that the combination of the parameters is represented as "(top_field_first, repeat_first_field)", the combinations are repeated in 4 cycle units as follows.
(1,0), (1,1), (0,0), (0,1), (1,0), (1,1), (0,0), (0,1), . . . . , (1,0), (1,1), (0,0), (0,1), . . . .

At normal recording times, coding is performed while the parameters are changed not so as to break the periodical repetition. The stream generated by the coding unit 102 is supplied via the selection unit 108 to the recording unit 103, and is recorded on the recording medium 104.

In FIG. 1, in a case where a stream already stored in the storage medium 104 is connected to another stream and is recorded, as the parameters of the already recorded stream and those of the newly connected stream are determined, a phase mismatch occurs in the parameters in a junction position. For example, in FIG. 2, as the end (211) of a stream 210 has a 2-field structure and the head (221) of a stream 220 to be connected also has a 2-field structure, the repetition of 2-field and 3-field is broken.

Figure 2:
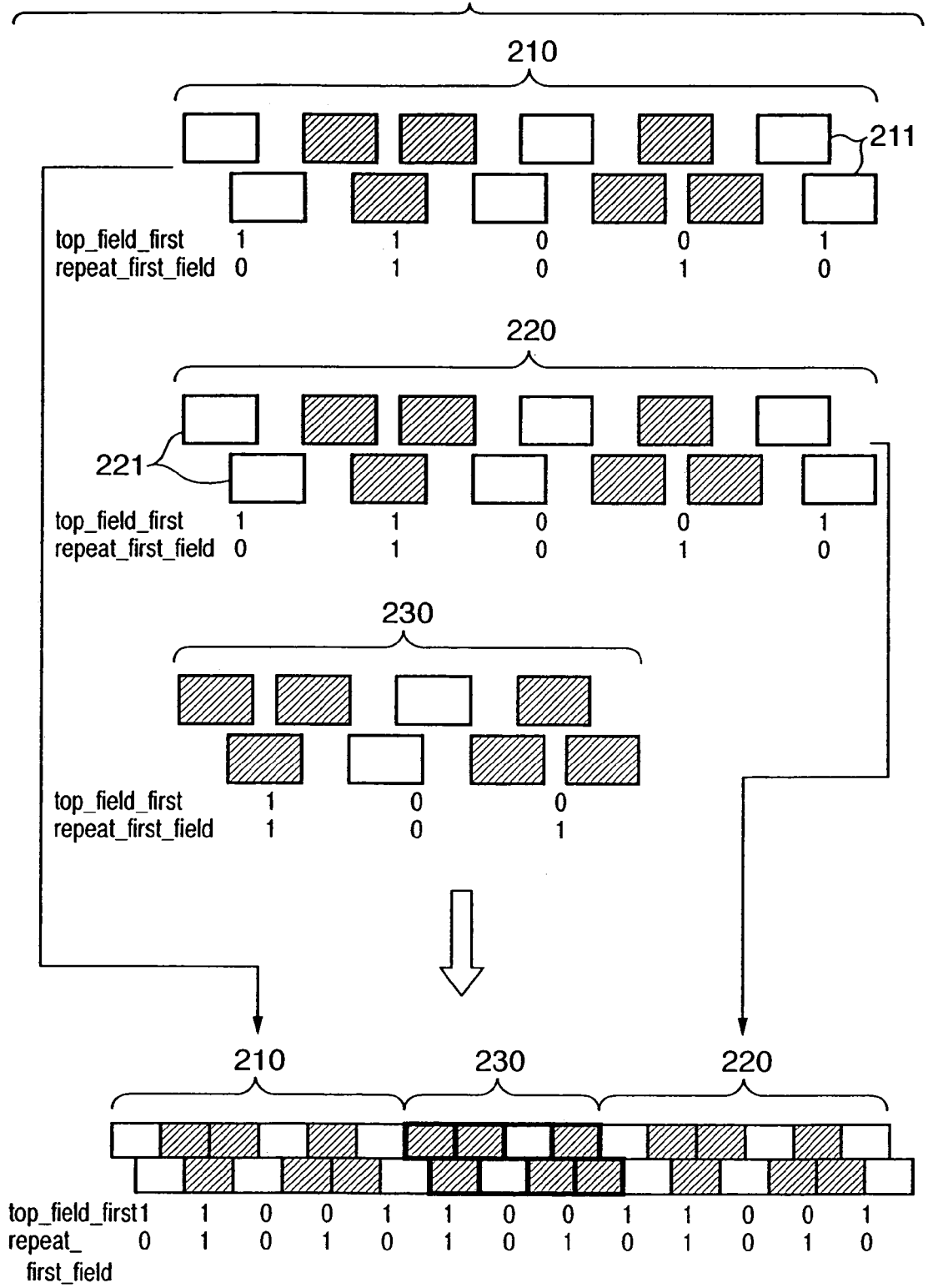
FIG. 2 is an explanatory view of MPEG stream connection processing according to the first embodiment.

In the present embodiment, the joint position information detection unit 107 reproduces and detects parameter information at the end of a stream to be subjected to joint recording (first stream: 210 in FIG. 2) among the streams already recorded on the recording medium 104, and the stream information detection unit 105 detects parameter information at the head of a stream to be newly joint-recorded (second stream: 220 in FIG. 2). The detected respective parameter information are supplied to the connection stream generation unit 106, in which a connection stream to maintain parameter continuity between the two streams (230 in FIG. 2) is generated. The generated connection stream is supplied via the selection unit 108 to the recording unit 103, and recorded on the recording medium 104 such that the connection stream is inserted between the two streams.

Figure 3:
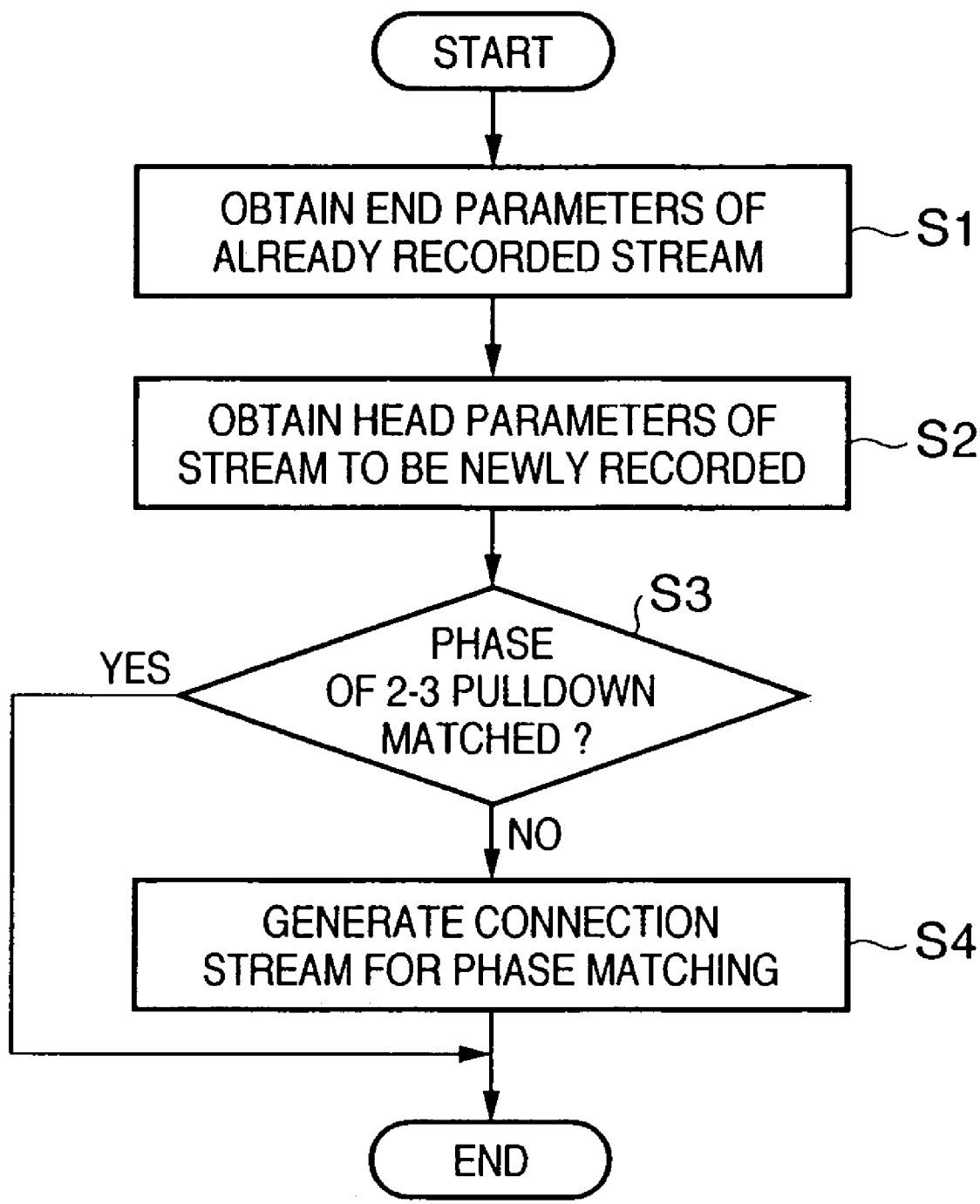
FIG. 3 is a flowchart showing a processing procedure according to the first embodiment.

FIG. 3 is a flowchart showing the processing by the connection stream generation unit 106. At step S1, end parameters of the first stream 210, supplied from the joint position information detection unit 107, are obtained. At step S2, head parameters of the second stream 220, supplied from the stream information detection unit 105, are obtained. At step S3, the continuity between the end parameters and the head parameters, i.e., phase conformity is determined.

In the present embodiment, as it is assumed that parameters (1,0), (1,1), (0,0), (0,1) are sequentially generated, it is determined whether or not the order of the end parameters of the first stream and the head parameters of the second stream corresponds with the above order. Further, it is also determined by the above determination whether or not a connection stream including plural picture data must be generated.

In the case of FIG. 2, as the end parameter values of the first stream 210 and the head parameter values of the second stream 220 are (top_field_first, repeat_first_field)=(1,0), the connection stream 230 having 3 pictures having parameter (top_field_first, repeat_first_field) values (1,1), (0,0), (0,1) is generated (inserted). At step S4, the connection stream for phase matching is generated and recorded in a position following the end of the first stream.

If the recording medium 104 is a tape, the generated connection stream is recorded prior to recording of the second stream, and then the second stream is recorded. At this time, the second stream, generated from a video signal real-time inputted from the image sensing system or film scanner, must be saved in a buffer memory in the recording unit 103, during generation and recording of the connection stream. The second stream may be similarly saved in the buffer if the recording medium 104 is a disk, and further, it may be arranged such that the connection stream is independently recorded after the second stream and then the connection stream is inserted between the first stream and the second stream by editing.

In FIG. 2, the stream 230 is a connection stream for phase matching between the stream 210 and the stream 220. As the parameter values of the stream 230 are (1,1), (0,0), (0,1), the end parameter values (1,0) and the head parameter values (1,0) can be connected with an appropriate phase.

A video image represented with the connection stream 230 is simply generated by utilizing the end picture of existing stream (e.g., first stream) as a P picture or B picture. As a result, the data size of the connection stream is very small. In this manner, a constant data rate can be maintained in a joint portion by appropriately inserting stuffing data and controlling data amount. The buffer can be prevented from causing underflow/overflow by keeping the data rate constant according to the stuffing data inserted into the connection stream 230, when decoding joint portion.

Figure 8:
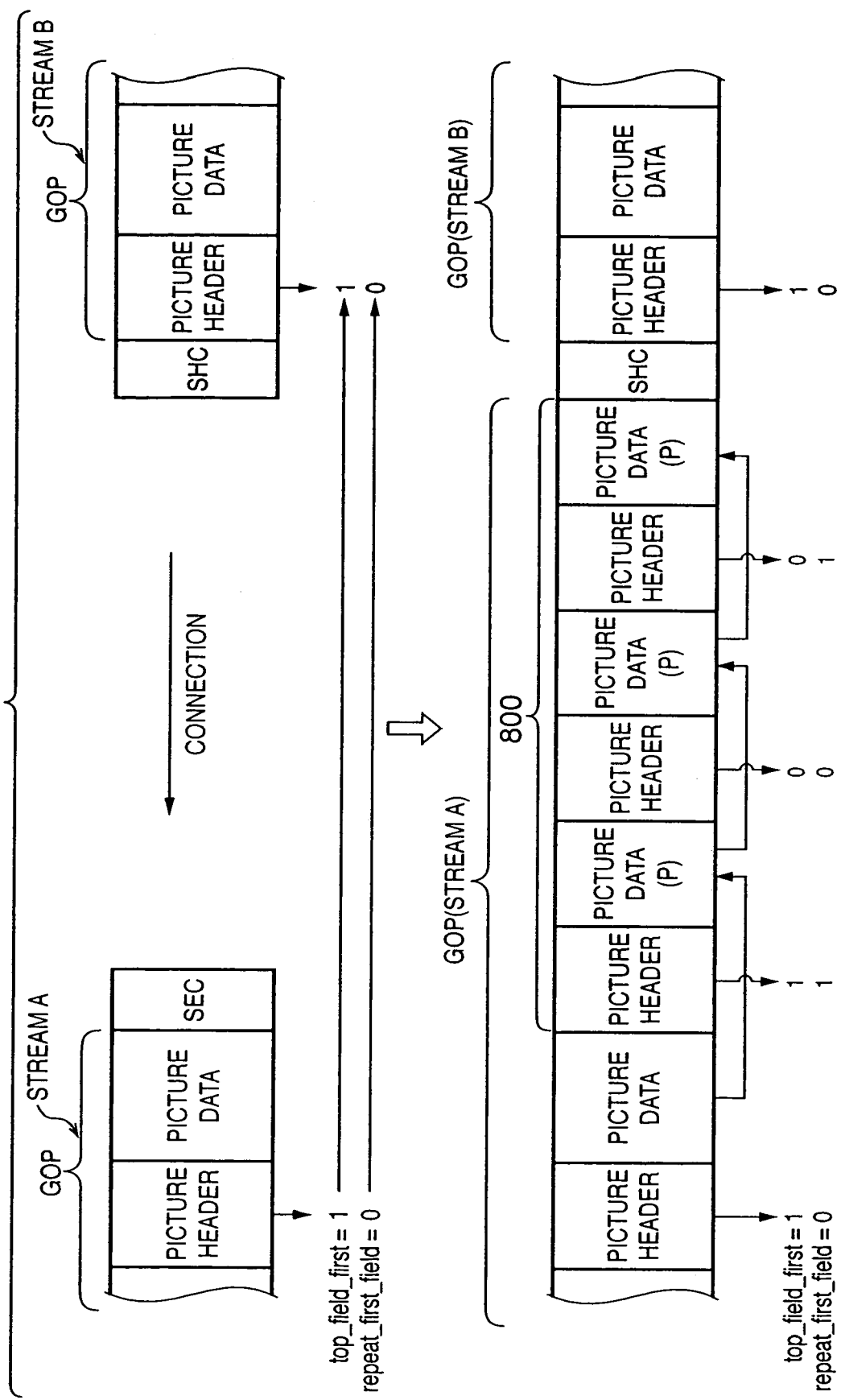
FIG. 8 is an explanatory view showing the structures of 2 MPEG streams and a connection-processed stream.

The connection will be described with reference to FIG. 8 showing the streams in FIG. 2 as coded streams. That is, the stream B is connected to the end of the stream A. The parameters (top_field_first, repeat_first_field) of the end picture of the stream A and the head picture of the stream B both have values (1,0). In this case, a connection stream 800 having parameter values (1,1), (0,0), (0,1) is generated. These 3 pictures have information indicating utilization of the end picture of the stream A.

Note that as the stream A and the stream B are connected, the SEC (Sequence End Code) at the end of the stream A is deleted, and an SEC is added to the end of the connected stream B. Further, the connection stream 800 belongs to a GOP (Group Of Pictures) of the end picture of the stream A.

As it is fully understood from the above description, the connection stream has maximum 3 pictures (each picture has 2 or 3 fields) to 0 picture. In the case of 0 picture, i.e., when it is determined that phases of the preceding and the subsequent streams are matched, generation and recording of connection stream are not performed (corresponding to NO at step S3 in the flowchart of FIG. 3).

Further, in the present embodiment, the respective pictures of the connection stream are P pictures utilizing the end picture of the stream A, however, they may be B pictures. Further, it is apparent that the respective pictures of the connection stream may be generated by utilizing the head picture of the stream B. In the latter case, An SHC (Sequence Header Code) is inserted at the head of the connection stream, and the SHC at the head of the stream B is deleted.

Figure 9:
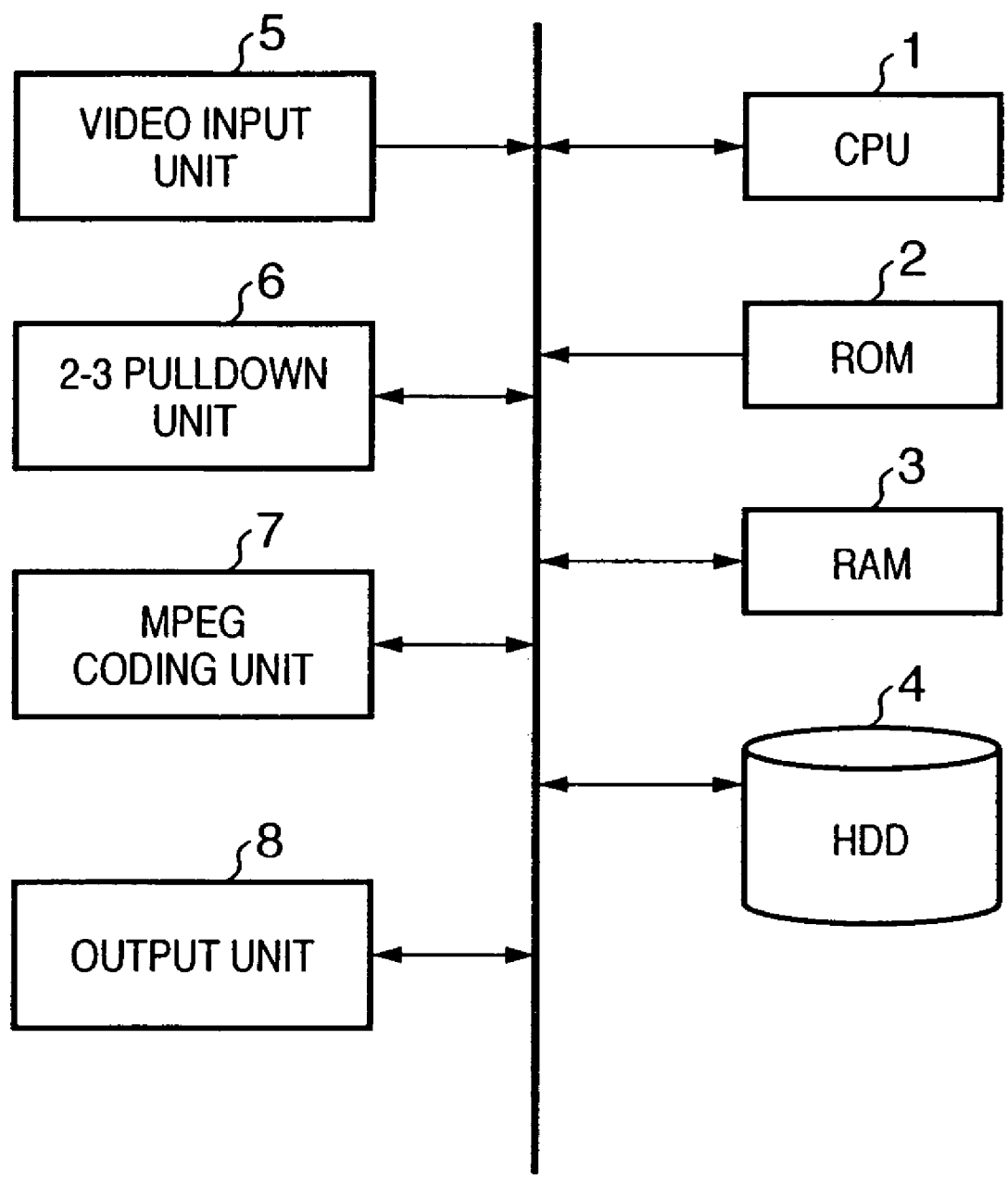
FIG. 9 is a block diagram showing an apparatus construction in the case of processing via software.

FIG. 9 is a block diagram showing a case where the image processing according to the present embodiment is implemented on a general information processing apparatus such as a personal computer.

In FIG. 9, numeral 1 denotes a CPU to control the overall apparatus; 2, a ROM holding a BIOS and a boot program; 3, a RAM used as a work area; 4, an external storage device (hard disk or the like) holding an OS, programs for compression coding and stream connection processing according to the present embodiment, and respective streams; and 5, a video input unit to sequentially read film material used in movies. As the video input unit, any unit may be employed as long as it inputs 24 frames/sec video images. For example, an image sensing apparatus (or image sensing means) to obtain a 24 frames (48 fields)/sec. video image or a film scanner to sequentially read a 24 frames/sec. film material video image (each frame is read as 2-field video image data, otherwise, read data may be converted to 2 field data thereafter on the apparatus side). Further, a network interface may be employed if material data exists on a network.

Numeral 6 denotes a 2-3 pulldown unit; and 7, an MPEG coding unit. Note that as recent PCs have a very high processing capacity, processings corresponding to the 2-3 pulldown unit 7 and the MPEG coding unit 7 may be realized as software processing. Numeral 8 denotes an output unit to output the result of editing such as connection processing. As the output unit, a DVD recorder apparatus or the like may be assumed, however, if the output destination exists on a network (such as a file server), the output unit is a network interface.

In this construction, when the power of the apparatus is turned on, the OS is loaded on the RAM 2, then the application program according to the present embodiment is loaded on the RAM 2, thereby the processing corresponding to the flowchart of FIG. 3 is performed, and the data is stored in the external storage device 4 (corresponding to the recording medium 104 in FIG. 1). Then, in accordance with a user's instruction, the data is written onto a DVD medium. Note that it may be arranged such that the data is not temporarily stored in the hard disk but directly stored on a storage medium such as a DVD. That is, a preceding stream, a subsequent stream, and a connected stream generated by connection of the preceding and subsequent streams may be stored in respectively different storage media.

Further, in FIG. 1, a 24 frames/sec video image stream as a film material is inputted from the video signal input terminal 101, however, it may be arranged such that 2 streams to be connected are stored in the external storage device 4. That is, the present embodiment is effective as long as already pull-down-processed and MPEG-coded images are connected.

Note that in the above embodiment, a connection stream has up to 3 picture data, on the premise of conversion from 24 frames to 30 frames. It is apparent that in the case of other frame rate conversions, the number of pictures is changed in correspondence with frame rate. Further, if the number of pictures included in the connection stream is increased, it may be arranged such that the pictures are divided into 2 sections. The picture data in the first section are generated by utilizing picture data at the rear end of the first stream, while the picture data in the second section are generated by utilizing picture data at the front end of the second stream.

Further, if the recording medium 104 is a random-accessible storage medium such as a hard disk, plural coded stream data exist there. In such case, the apparatus has means for designating 2 of the plural streams recorded on the recording medium, or means for designating 1 of the streams as a stream with which data, inputted from the outside and encoded, is connected. Further, when 3 or more streams are to be connected, as the processing for connecting 2 streams is repeated, the apparatus has means for designating the order of repetition of the processing.

Further if the recording medium 104 is a sequentially-accessible medium such as a magnetic tape, such designation means is unnecessary (note that means for searching for an end position of already-recorded stream is necessary).

Further, in a case where the construction in FIG. 1 is applied to an image sensing apparatus such as a video camera, it is preferable to provide designation means such as a button, for designating whether a stream newly obtained by image sensing is connected to an already-recorded stream and the connected stream is recorded, or the newly obtained stream is independently recorded as a new stream.

Second Embodiment

Figure 4:
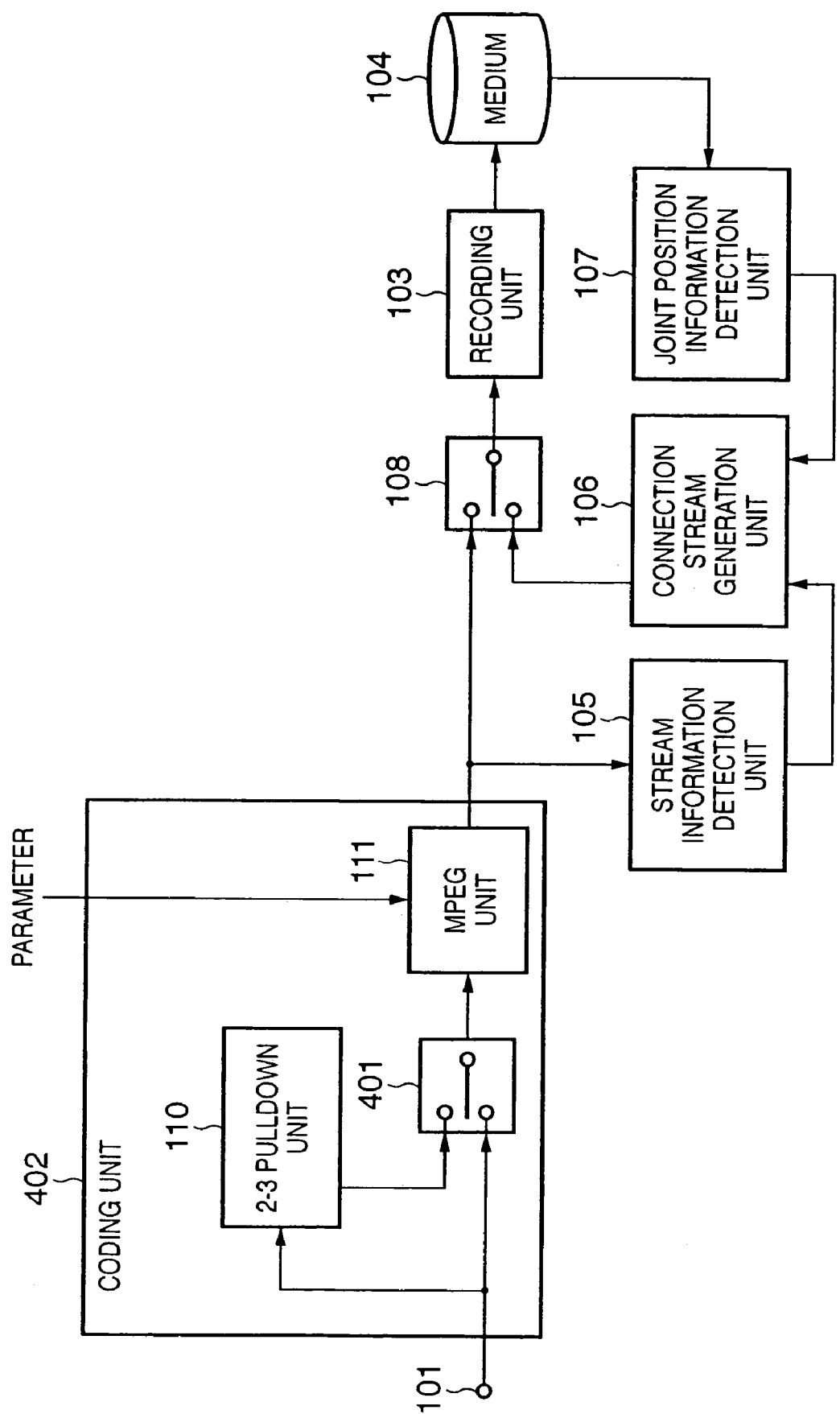
FIG. 4 is a block diagram showing the image processing apparatus according to a second embodiment of the present invention.

Next, a second embodiment of the present invention will be described. FIG. 4 is a block diagram showing the image processing apparatus according to the second embodiment. The construction is similar to that in FIG. 1 of the first embodiment except a coding unit 402 (the corresponding functional elements have the same reference numerals).

In FIG. 4, the coding unit 402 has a selection unit 401. If an input video signal has a frame rate of about 24 frames per 1 second, the video signal is supplied via the 2-3 pulldown unit 110 to the MPEG unit 111, while if the input video signal has a frame rate of about 30 frames per 1 second (60 fields), the video signal is directly supplied to the MPEG unit 111. In any case, the MPEG unit 111 outputs a 30 frames/sec coded stream. The selection by the selection unit 401 is made from the user's instruction with a predetermined switch, otherwise, may be made based on discrimination of information, if exists, at the head of input video data.

If the video image inputted from the input terminal has the frame rate of about 30 frames per 1 sec, the parameter values (top_field_first, repeat_first_field) are fixedly (1,0) or (0,0).

Upon connection between a stream having a 24 f/s frame rate and a stream having a 30 f/s frame rate, the connection stream generation unit 106 generates a connection stream to smoothly connect the repetition of the above parameters.

For example, connection between a stream having the 30 f/s frame rate ((top_field_first, repeat_first_field) values are fixedly (1,0))(stream recorded without 2-3 pulldown processing) already recorded on the recording medium, and a stream having the 24 f/s frame rate (as the head parameters, (top_field_first, repeat_first_field)=(0,1), (1,0), (1,1), . . . ) will be studied.

In a case where the rear end picture parameters of the already-recorded stream are (top_field_first, repeat_first_field)=(1,0), and the parameters of the head picture of the subsequent stream (24 f/s) after the 2-3 pulldown-processing are (1,0), since this condition corresponds to that of the first embodiment, a connection stream having parameters (1,1), (0,0), (0,1) is generated, and inserted between the rear end of the already-recorded stream and the head of the subsequent stream.

Further, in a case where the already-recorded stream is a stream which has been 2-3 pulldown-processed and encoded and the parameters of its rear end picture are (top_field_first, repeat_first_field)=(1,0), and a 30 f/s stream where the parameters are fixedly (1,0) is connected as a subsequent stream, a connection stream is generated and inserted as in the above case.

Accordingly, in the second embodiment, the processing procedure is substantially the same as that in FIG. 3.

Third Embodiment

Figure 5:
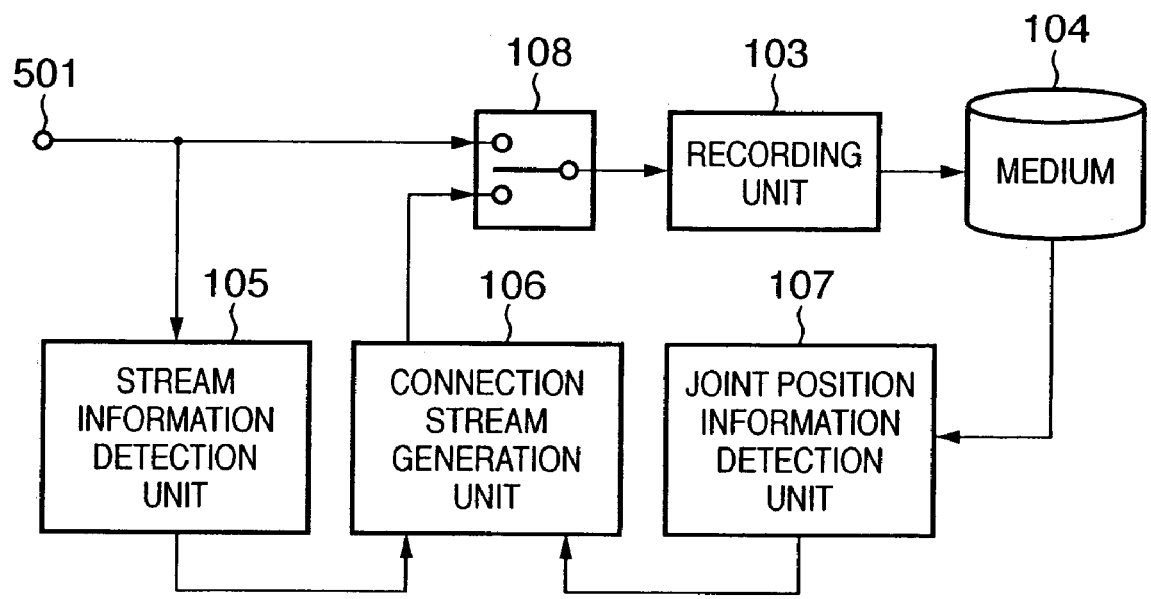
FIG. 5 is a block diagram showing the image processing apparatus according to a third embodiment of the present invention.
Figure 6:
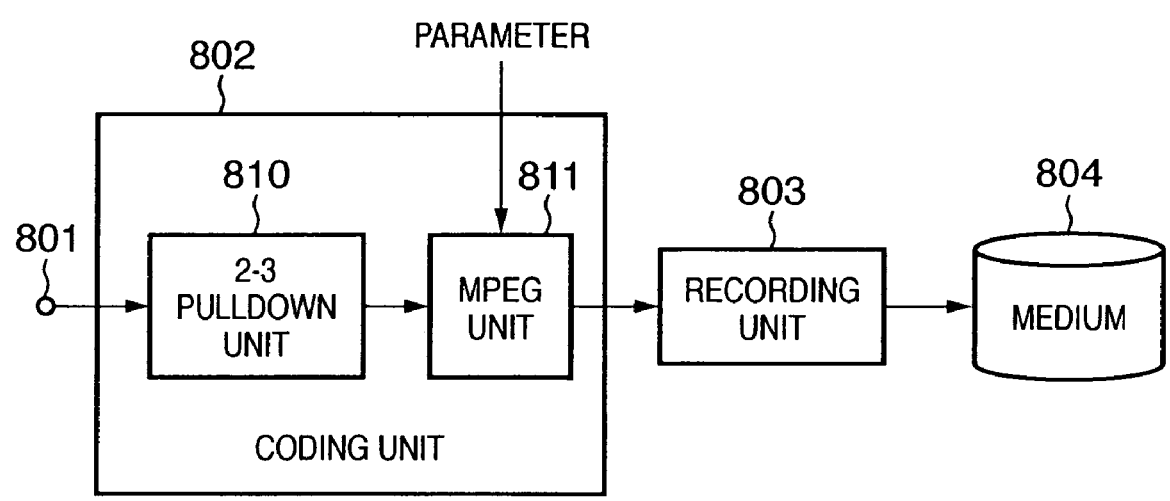
FIG. 6 is a block diagram showing a conventional coding apparatus using 2-3 pulldown processing.
Figure 7:
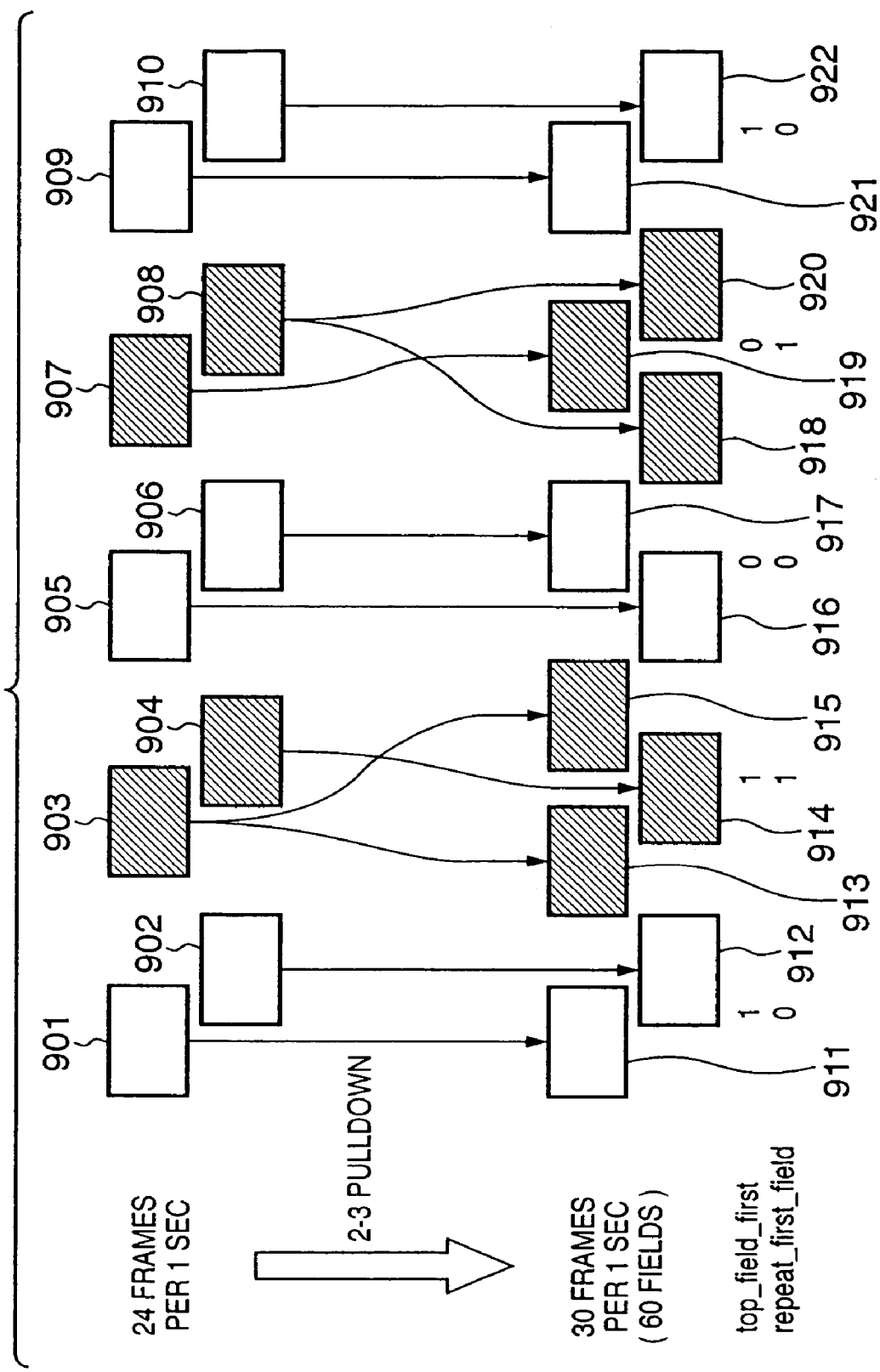
FIG. 7 is an explanatory view of the 2-3 pulldown processing and assignment of parameters top_fiel_first and repeat_first_field for suppression of data redundancy.

Next, a third embodiment of the present invention will be described. FIG. 5 is a block diagram showing the image processing apparatus according to the third embodiment.

The difference from the first and second embodiments is that the video signal input terminal 101 and the coding unit 102 are replaced with a stream input unit 501. The other blocks are identical to those of the previous construction. That is, in the apparatus according to the third embodiment having no coding unit, already-coded streams are connected with each other. In this construction, smooth connection to maintain repeated parameter phase in joint portion can be realized in accordance with the above-described procedure.

As described above, the means for realizing the functions in the first to third embodiments may be a general information processing apparatus such as a personal computer as well as an image sensing apparatus. That is, the present invention includes a computer utility application program in its scope. Further, since a computer program is generally stored on a computer-readable storage medium such as a CD-ROM and duplicated/installed into the system from the medium set in the computer, thereby becomes executable, such computer-readable storage medium is also included in the scope of the invention.

As described above, according to the present invention, upon connection between 2 video coded streams, a dummy stream is generated and inserted to maintain periodicity of phase information therebetween. Thus smooth joint recording while maintaining stream continuity without re-encoding can be realized.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-392076 filed on Nov. 21, 2003, the entire contents of which is hereby incorporated by reference herein.

What is claimed is:

1. An image processing apparatus for processing video coded stream data in which a field picture sequence is generated by converting moving image data having a predetermined frames per 1 second by alternately generating 2-field picture data and 3-field picture data from respective frames of said moving image data and adding phase information of fields in respective pictures of the converted moving image data, comprising:

first detection means for detecting the phase information of picture data at a rear end of an already-recorded first video coded stream;

second detection means for detecting the phase information of picture data at a head of a second video coded stream to be recorded following said first video coded stream;

determination means for determining whether or not the phase information detected by said second detection means indicates next phase of the phase information detected by said first detection means;

generation means for, if said determination means determines that the phase information detected by said second detection means does not indicate the next phase of the phase information detected by said first detection means, generating a dummy stream to maintain periodicity of the phase information between said first and second video coded streams detected by said first and second detection means, where said dummy stream has combination of 2-field picture data and 3-field picture data obtained from one-field picture to cover shortfall difference between the phases detected by said first and second detection means and the length of said dummy stream is from one picture to three pictures; and recording means for, if said determination means determines that the phase information detected by said second detection means indicates the next phase of the phase information detected by said first detection means, recording the second video coded stream to a storage medium so as to link the second video coded stream to the rear end of the first video coded stream, while, if said determination means determines that the phase information detected by said second detection means does not indicate the next phase of the phase information detected by said first detection means, recording said dummy stream generated by said generation means to the storage medium, so as to insert said dummy stream between the rear end of said first video coded stream and the head of said second video coded stream.

2. The image processing apparatus according to claim 1, wherein said generation means generates said dummy stream by duplicating at least one picture data positioned in the rear end of said first video coded stream.

3. The image processing apparatus according to claim 1, wherein said generation means generates said dummy stream by duplicating at least one picture data positioned in the head of said first video coded stream.

4. The image processing apparatus according to claim 1, wherein said dummy stream generated by said generation means includes stuffing data to maintain a contiguous data rate between said first video coded stream and said second video coded stream.

5. The image processing apparatus according to claim 1, wherein said phase information has information indicating whether one picture data has a 2 field structure or 3 field structure, and information indicating whether a first field of the picture data is preceding or subsequent to a second field.

6. The image processing apparatus according to claim 5, wherein if one picture data has the 3 field structure, said phase information includes information using a first field of the 2 field structure as a third field.

7. The image processing apparatus according to claim 1, further comprising:

input means for inputting video data to be subjected to compression coding;

2-3 pulldown processing means for alternately generating 2-field picture data and 3-field picture data from respective frames of the input video data; and moving image compression means for adding the phase information of fields in respective pictures obtained by said 2-3 pulldown processing means and performing compression coding.

8. The image processing apparatus according to claim 7, wherein said input means is image sensing means.

9. A control method for an image processing apparatus for processing video coded stream data in which a field picture sequence is generated by converting moving image data having a predetermined frames per 1 second by alternately generating 2-field picture data and 3-field picture data from respective frames of said moving image data and adding phase information of fields in respective pictures of the converted moving image data, comprising:

a first detection step of detecting the phase information of picture data at a rear end of an already-recorded first video coded stream;

a second detection step of detecting the phase information of picture data at a head of a second video coded stream to be recorded following said first video coded stream;

a determination step for determining whether or not the phase information detected by said second detection step indicates next phase of the phase information detected by said first detection step;

a generation step of, if said determination step determines that the phase information detected by said second detection step does not indicate the next phase of the phase information detected by said first detection step, generating a dummy stream to maintain periodicity of the phase information between said first and second video coded streams detected at said first and second detection steps, where said dummy stream has combination of 2-field picture data and 3-field picture data obtained from one-field picture to cover shortfall difference between the phases detected by said first and second detection steps and the length of said dummy stream is from one picture to three pictures; and a recording step of, if said determination step determines that the phase information detected by said second detection step indicates the next phase of the phase information detected by said first detection step, recording the second video coded stream to a storage medium so as to link the second video coded stream to the rear end of the first video coded stream, while, if said determination step determines that the phase information detected by said second detection step does not indicate the next phase of the phase information detected by said first detection step, recording said dummy stream generated at said generation step to the storage medium, so as to insert said dummy stream between the rear end of said first video coded stream and the head of said second video coded stream.

10. A computer program embodied on a computer-readable medium, the program to function as an image processing apparatus for processing video coded stream data in which a field picture sequence is generated by converting moving image data having a predetermined frames per 1 second by alternately generating 2-field picture data and 3-field picture data from respective frames of said moving image data and adding phase information of fields in respective pictures of the converted moving image data, said program functioning as:

first detection means for detecting the phase information of picture data at a rear end of an already-recorded first video coded stream;

second detection means for detecting the phase information of picture data at a head of a second video coded stream to be recorded following said first video coded stream;

determination means for determining whether or not the phase information detected by said second detection means indicates next phase of the phase information detected by said first detection means;

generation means for, if said determination means determines that the phase information detected by said second detection means does not indicate the next phase of the phase information detected by said first detection means, generating a dummy stream to maintain periodicity of the phase information between said first and second video coded streams detected by said first and second detection means, where said dummy stream has combination of 2-field picture data and 3-field picture data obtained from one-field picture to cover shortfall difference between the phases detected by said first and second detection means and the length of said dummy stream is to three pictures; and recording means for, if said determination means determines that the phase information detected by said second detection means indicates the next phase of the phase information detected by said first detection means, recording the second video coded stream to a storage medium so as to link the second video coded stream to the rear end of the first video coded stream, while, if said determination means determines that the phase information detected by said second detection means does not indicates the next phase of the phase information detected by said first detection means, recording said dummy stream generated by said generation means to the storage medium, so as to insert said dummy stream between the rear end of said first video coded stream and the head of said second video coded stream.

* * * * *